United States Patent [19]

Itoh

[11] Patent Number: 4,710,832
[45] Date of Patent: Dec. 1, 1987

[54] TRACKING SYSTEM FOR ROTARY MAGNETIC RECORDING MEDIUM USING WEIGHTED SAMPLED TRACK VALUES

[75] Inventor: Haruo Itoh, Kaisei, Japan
[73] Assignee: Fuji Photo Film Co., Ltd., Kanagawa, Japan
[21] Appl. No.: 658,440
[22] Filed: Oct. 5, 1984
[30] Foreign Application Priority Data Oct. 14, 1983 [JP] Japan .................... 58-190631

[51] Int. Cl.⁴ .......................................... H04N 5/781
[52] U.S. Cl. .................... 360/10.2; 360/10.1; 360/77; 358/342
[58] Field of Search ............... 360/9.1, 10.1, 10.2, 360/75, 77; 369/43–44, 45, 54, 58; 358/335, 342

[56] References Cited

U.S. PATENT DOCUMENTS

| | | | |
|---|---|---|---|
| 4,148,083 | 4/1979 | Watanabe | 360/77 |
| 4,402,070 | 8/1983 | Sugiyama et al. | 360/10.2 X |
| 4,443,823 | 4/1984 | Sakamoto | 360/10.2 X |
| 4,470,078 | 9/1984 | Hirata et al. | 360/10.2 X |
| 4,470,079 | 9/1984 | Tsuruta | 360/77 X |
| 4,486,796 | 12/1984 | Sakamoto | 360/10.2 X |
| 4,520,410 | 5/1985 | Sekiguchi et al. | 360/77 |
| 4,525,750 | 6/1985 | Hamalainen | 360/77 X |

*Primary Examiner*—Raymond F. Cardillo
*Assistant Examiner*—Wayne R. Young
*Attorney, Agent, or Firm*—Birch, Stewart, Kolasch & Birch

[57] ABSTRACT

A tracking system for a rotary magnetic recording medium includes a magnetic head for sensing signals on a plurality of tracks formed on the recording medium such that a beginning and an end of recording align with each other, a head feeding unit for transporting the magnetic head to a position where a desired one of the tracks is located, and a control unit for controlling the head feeding unit to effect tracking. The control unit includes an operational unit for sampling a signal sensed by the head in response to a rotation of the recording medium at a plurality of sampling points, and adds the sampled values with predetermined weights. Based on a result of the weighted addition, the control unit performs a tracking control.

8 Claims, 19 Drawing Figures

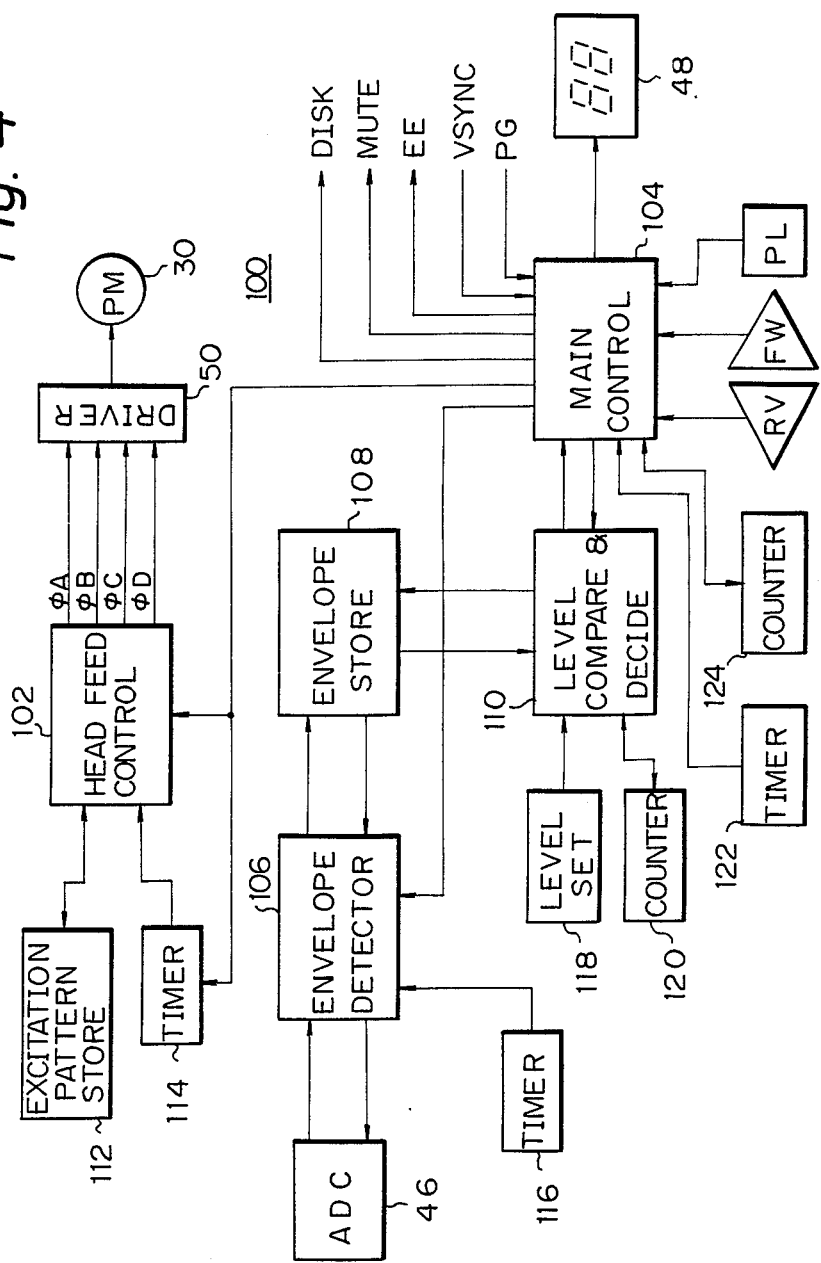

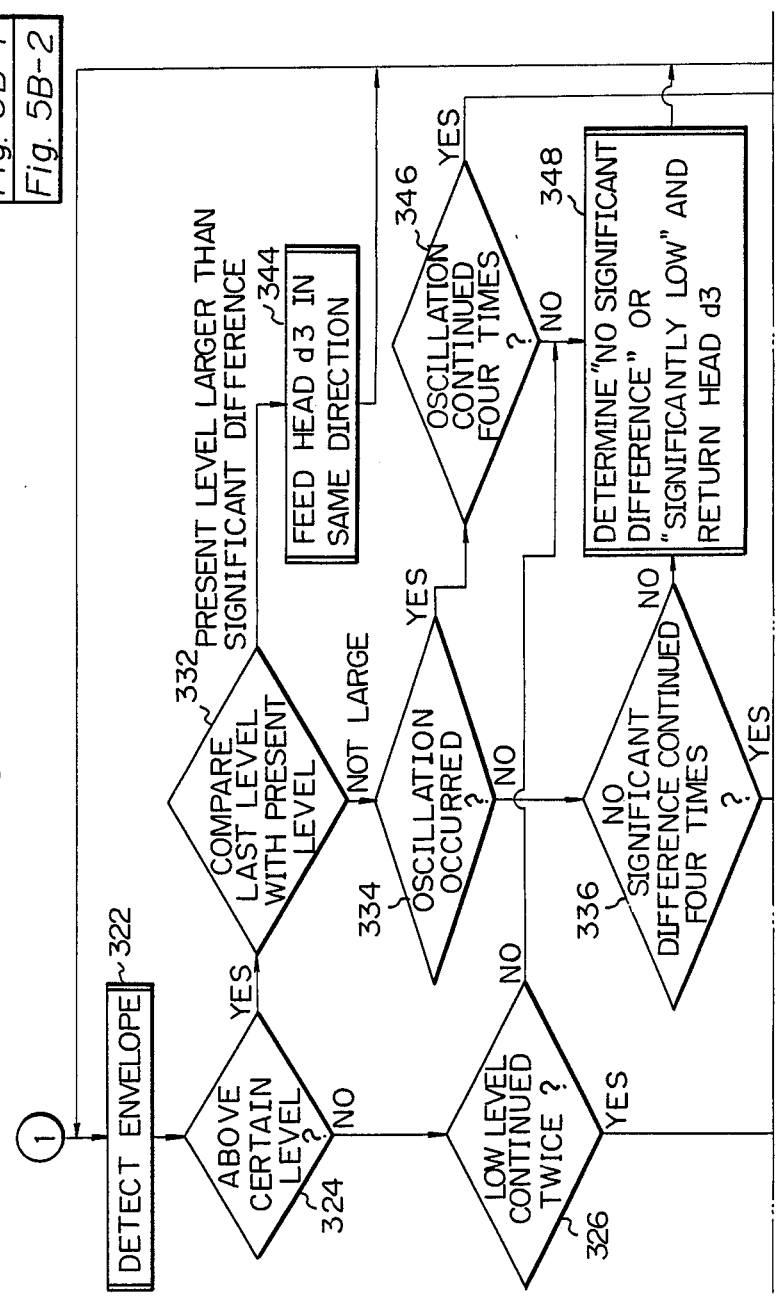

| PLSCT | 10 | 9 | 8 | 7 | 6 | 5 | 4 | 3 | 2 | 1 |
|---|---|---|---|---|---|---|---|---|---|---|
| TIME(ms) | 6 | 5.5 | 5 | 4.5 | 4 | 4 | 4 | 4.5 | 5 | 5.5 |

| Fig.12A-1 | Fig.12A-2 |

```
        ( OBJECT TRACK ) ~420
           SPECIFYING
                │
                ▼
         ╱OBJECT TRACK╲ 422
    NEGATIVE ─PRESENT TRACK── POSITIVE
        ╱        =0        ╲
       ▼         │          ▼
  ┌──────────┐  END   ┌──────────────┐
  │(PRESENT  │        │(OBJECT TRACK │
  │ TRACK    │        │-PRESENT      │
  │-OBJECT   │        │ TRACK-1)     │
  │ TRACK-1) │        │→TRACK COUNTER│~424
  │→TRACK    │        └──────┬───────┘
  │ COUNTER  │~428          │
  └─────┬────┘              ▼
        ▼               ┌─────────┐
   ┌─────────┐          │SPECIFY  │
   │SPECIFY  │~430      │POSITIVE │~426
   │NEGATIVE │          │FEED     │
   │FEED     │          │DIRECTION│
   │DIRECTION│          └────┬────┘
   └────┬────┘               │
        └──────────┬─────────┘
                   ▼
              ╱   IN    ╲  YES
              ╲EXCITATION╱─────┐
               ╲   ?    ╱      │
                ╲  │   ╱       │
                 432│NO         │
                   ▼           │
         ┌──────────────────┐  │
         │EXCITE STEP MOTOR │  │
         │WITH FINAL PATTERN│~434
         │OF LAST EXCITATION│  │
         └────────┬─────────┘  │
                  └────────────┘
```

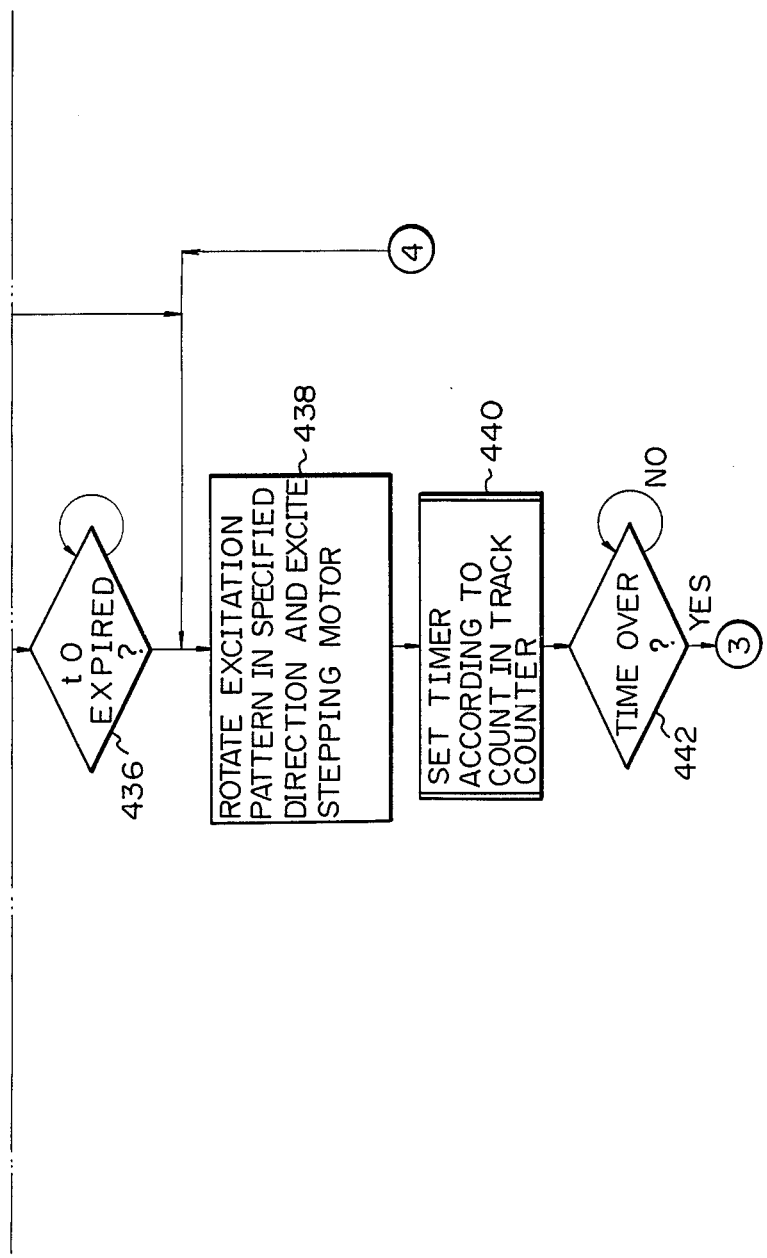

TRACKING SYSTEM FOR ROTARY MAGNETIC RECORDING MEDIUM USING WEIGHTED SAMPLED TRACK VALUES

BACKGROUND OF THE INVENTION

1. Field of the Invention

The present invention relates to a tracking system for a rotary magnetic recording medium, and, more particularly, to a tracking system for tracking a rotary magnetic recording medium such a magnetic disc or a magnetic drum in order to retrieve information therefrom. Still more particularly, the present invention is concerned with a tracking system for reproducing information from concentric tracks formed on a magnetic disc under tracking servo control.

2. Description of the Prior Art

An electronic still camera system has recently been developed which employs in combination an image pickup device such as a solid-state imaging device or an imaging tube and a recording device of the type using, as a recording medium, magnetic discs which are inexpensive and have relatively large storage capacity. A desired object is shot as a still picture purely electronically by the image pickup device to be recorded in a rotating disc by the recording device, the picture being reproduced by means of a television system, a printer or other suitable devices.

The problem encountered with recording media used for such magnetic recording, particularly magnetic discs, is that tracking errors are often invited by their anisotropy, eccentricity or offset, thermal expansion, etc. That is, part of a track adjacent to desired one tends to the be sensed during playback to result in crosstalk.

In order to solve the above problem, it has been proposed to record a tracking signal on a magnetic recording medium together with information under tracking servo control, and reproduce the information with tracking servo effected by use of the tracking signal. However, when it comes to cameras and other small and light recording apparatus, installation of a tracking servo mechanism which requires accurate control is impractical.

Such a situation may be settled by using a guard band recording system or a frequency modulation (FM) azimuth recording system. The system is such that some degree of tracking error is compensated for by preventing a playback head from scanning a nearby track or, if scanned, preventing it from picking up a signal therefrom.

In addition, also used is a so-called "wobbling" system. In accordance with this system, during recording a head is fed at a predetermined track pitch on a track-by-track basis by a stepping motor without tracking servo applied, whereas, during playback, tracking servo is applied by detecting an envelope of a signal retrieved from each track so as to identify an optimum track based on its peak position.

For the convenience of use, it is generally advantageous to construct a playback apparatus for magnetic discs and other rotary magnetic recording media such that a medium is removably loaded and such media recorded with a variety of information are selectively used. Therefore, it cannot be guaranteed that the center of tracks on a medium be accurately aligned with that of a rotary drive shaft of the playback apparatus any time the medium is loaded in the apparatus, that is, the position usually involves some eccentricity. In addition, it cannot be assured that the signals recorded in a medium will be in concentric tracks which are precisely concentric with the center of rotation of the medium.

Where the center of a medium becomes offset to different degrees every time it is loaded in a playback apparatus or where the tracks of the medium per se are eccentric, signals reproduced therefrom will undergo variation in level in unison with the rotation of the medium. Assuming that signals recorded in a medium are field video signals, the level might become high in a former half of a field relative to a latter half, or vice versa, or averaged as a whole with no regard to the contents of the video signals, in dependence on the eccentric condition of the medium.

In the wobbling system, as previously described, tracking control is performed based on the envelope of a recorded signal. Hence, should the envelope level depend on the eccentric position of the medium, such a system would fail to attain accurate tracking control.

Further, the reproduced signal level depends on the orientation of the magnetic material constituting the medium as well as on the manner of contact of the medium with a playback head. Therefore, an optimum track position cannot be detected if the tracking control is effected by such transient changes in envelope level.

Concerning a rotary magnetic recording medium for use with an electronic still camera system, for example, fifty tracks may be formed on a disc whose diameter is as small as about 50 millimeters, at track pitches of the order of 100 microns, i.e., with a track width of the order of 50–60 microns and a guard band width of 50–40 microns. In a playback apparatus, the magnetic disc is driven at a constant rate of 3,600 rpm to reproduce a video signal at a field frequency or a frame frequency. The wobbling system, therefore, requires accurate tracking control the positional accuracy of which is on the order of less than 10 microns.

SUMMARY OF THE INVENTION

It is therefore an object of the present invention to provide a tracking system for a rotary magnetic recording medium which is capable of accurately scanning tracks of the medium without being affected by the position of the medium relative to a playback apparatus.

A tracking system for a rotary magnetic recording medium has magnetic transducer means for sensing signals on a plurality of tracks each of which is formed on the recording medium such that relative positions of a beginning and an end of recording align with each other, transducer feeding means for feeding the transducer means to a position where desired one of the tracks is located, and control means for controlling the transducer feeding means to effect tracking. In accordance with the system of the present invention, the control means includes operational means for sampling at a plurality of sampling points a signal which is sensed by the transducer means in response to the rotating recording medium, and summing the sampled values with predetermined weights. The control means executes a tracking control in response to a result of the weighted addition of sampled values.

In a preferred embodiment, a signal recorded on the tracks contains a video signal which constitutes one effective picture frame to be displayed on a screen. The sampling means samples the signal at points associated with predetermined positions which include a central portion of the picture screen. The weights are larger in the central portion of the picture and smaller in a peripheral portion which surrounds the central portion.

The phrase "a plurality of tracks formed each with the relative position of the beginning and end of recording aligned with each other", which will appear herein, refer to tracks each of which is recorded without changing the position of a recording head relative to a rotary magnetic recording medium, e.g. numerous tracks formed on a magnetic disc concentrically with the axis of rotation and numerous parallel tracks formed along the circumference of a magnetic drum.

BRIEF DESCRIPTION OF THE DRAWINGS

The objects and features of the present invention will be apparent from a consideration of the following detailed description taken in conjunction with the accompanying drawings in which:

FIG. 4 is a schematic block diagram representative of functions of a control unit included in the arrangement of FIG. 1;

FIGS. 5A, 5B-1 and 5B-2, when combined as shown in FIG. 5B, 6, 7, 8, 12A-1 and 12A-2, when combined as shown in FIG. 12A, and 12B are flowcharts showing exemplary operations of the tracking system of FIGS. 1 and 4.

DESCRIPTION OF THE PREFERRED EMBODIMENT

Figure 1:
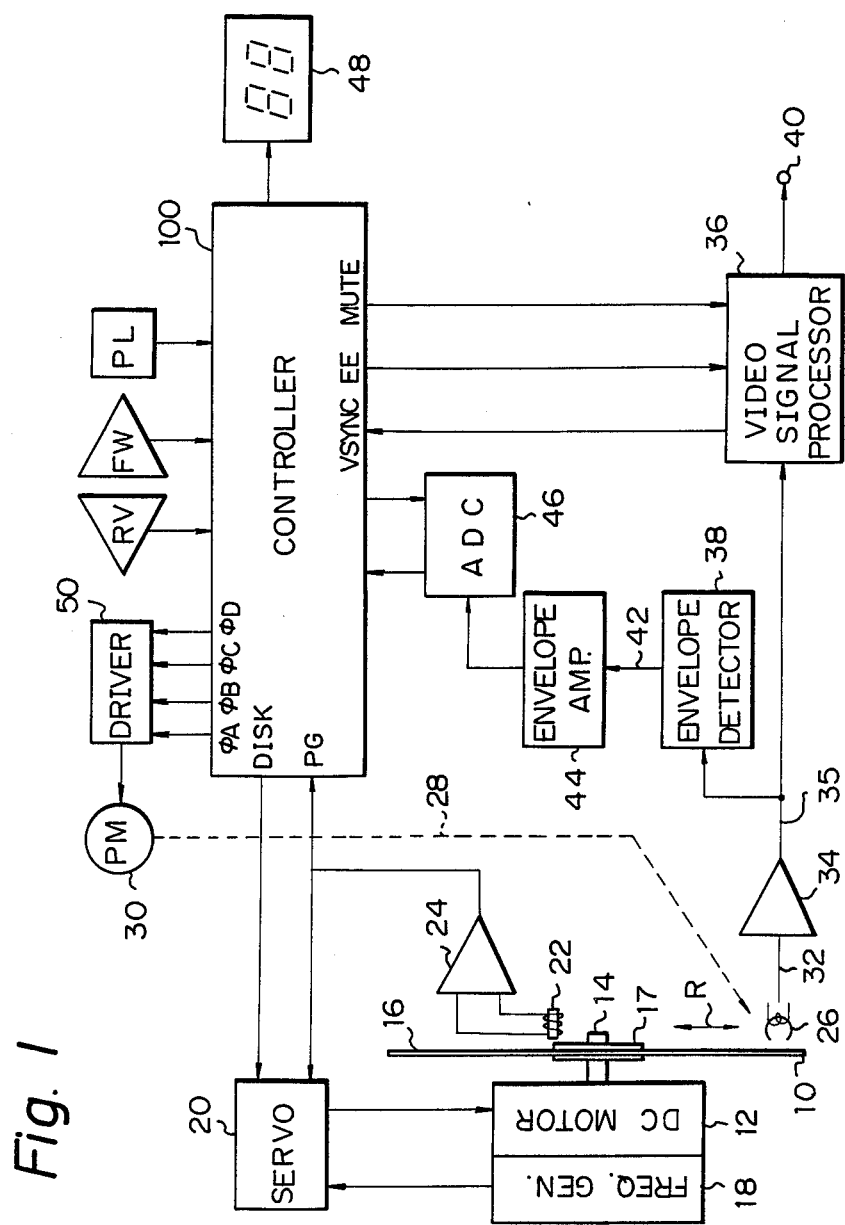
FIG. 1 is a schematic block diagram of a tracking system embodying the present invention.

Referring to FIG. 1, a tracking system in accordance with the present invention is shown. A rotary recording medium 10 such as a magnetic disc is removably mounted on a rotary shaft 14 of a dc motor 12. The disc 10 has a sheet of magnetic recording material having a diameter of about 50 millimeters. A plurality of tracks, such as fifty tracks, are formed concentrically on a recording surface 16 of the disc 10 at radial distances d0 (e.g. the order of 100 microns; see FIG. 3B). In this particular embodiment, signals recorded on the tracks are video signals such as color video signals having frequency modulated (FM) luminance signals and chroma signals. A field video signal forming one field of a picture may be recorded on one track by raster scanning fashion.

The dc motor 12 has a frequency generator 18 for generating an ac frequency signal. A servo circuit 20 supplies power to the dc motor 12, and controls it such that the disc 10 is rotatable at a predetermined speed, e.g. 3,600 rpm. The servo circuit 20 is interconnected to a control unit 100 which governs the whole system of the present invention, controllably rotating and stopping the disc 10 in response to a signal DISK.

A pulse generator 22 is located in a predetermined position adjacent to the recording surface 16 of the disc 10. The pulse generator 22 is interconnected to the servo circuit 20 and control unit 100 via an amplifier 24. Upon sensing a timing mark which is formed in a predetermined position on a core 17 supporting recording surface 16, the pulse generator 22 generates a timing pulse PG.

Disposed above the recording surface 16 of the disc 10 is a magnetic head, or transducer, 26 which is held by a support mechanism 28. The support mechanism 28 is driven by a stepping motor (PM) 30 as schematically indicated by a phantom line 28, so that the head 26 is movable along the recording surface 16 in radial direction as indicated by a double-headed arrow R, thereby selecting a desired one of the tracks on the disc.

Figure 5A:
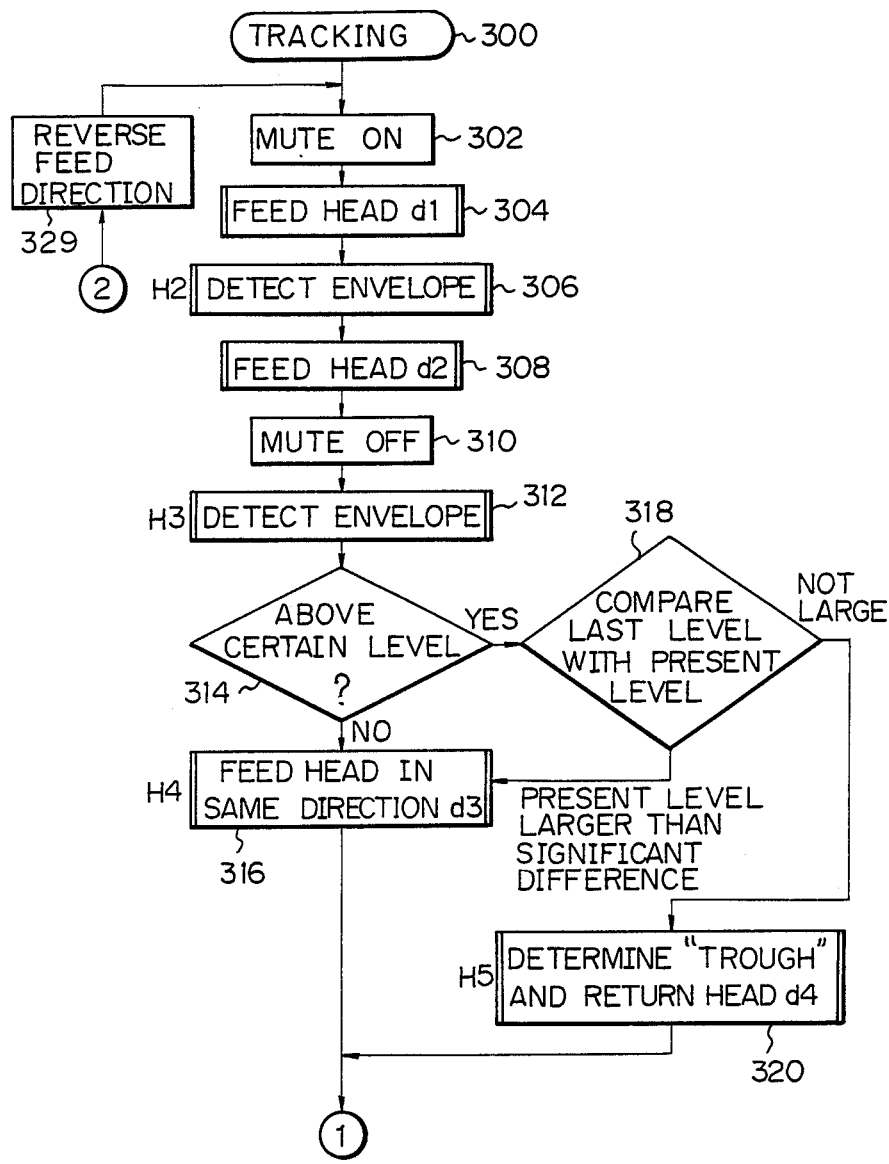
Figures 2, 5B:
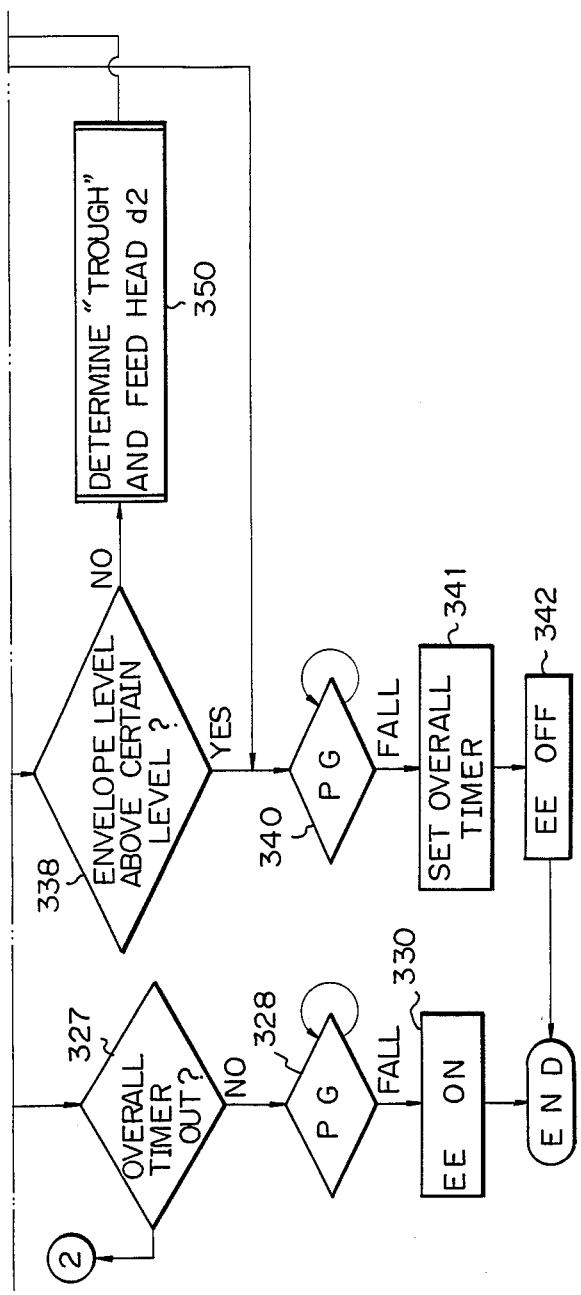

While the magnetic head 26 may have a magnetic recording function, in the illustrative embodiment it is furnished with only a playback function for picking up a video signal from a track on the disc surface 16 to transform the video signal into a corresponding electric signal. Since the disc 10 in the illustrative embodiment is rotated at a constant rate of 3,600 rpm as previously described, the head 26 reproduces one track of video signal, or one field of FM video signal, 200 as shown in, FIG. 2A, for each full rotation of the disc 10, i.e. 1/60 second. The video signal is demodulated as shown in the bottom of FIG. 2, and is compatible with standard color television systems such as the NTSC system.

The head 26 has an output 32 coupled to a video signal processor circuit 36 and an envelope detector circuit 38 via a preamplifier 34. The video signal processor 36 processes the video signal detected by the head 26 so as to send it to an output 40 of the system as, for example, a composite color video signal in an NTSC format. At the same time, the video signal processor 36 extracts a vertical sync signal VSYNC, FIG. 2A, from the demodulated composite color video signal, the signal VSYNC being routed to the controller 100. Meanwhile, in response to a signal EE from the controller 100, the processor 36 electrically disconnects itself from the circuitry associated with the head 26 to gain an EE state (electric-to-electric connection state). This specific state is available for applying another kind of signal such as a broadcasting signal to the output 40 or for a muting operation, i.e., making an effective horizontal scanning period of a video signal blank in response to a signal MUTE. It will be noted that the described conversion into a standard format is not essential in accordance with the present invention; the video signal processor 36 may be of the type capable of extracting a sync signal from a video signal sensed by the head 26 and simply delivering the video signal to the terminal 40 under control of the controller 100.

Figure 2A:
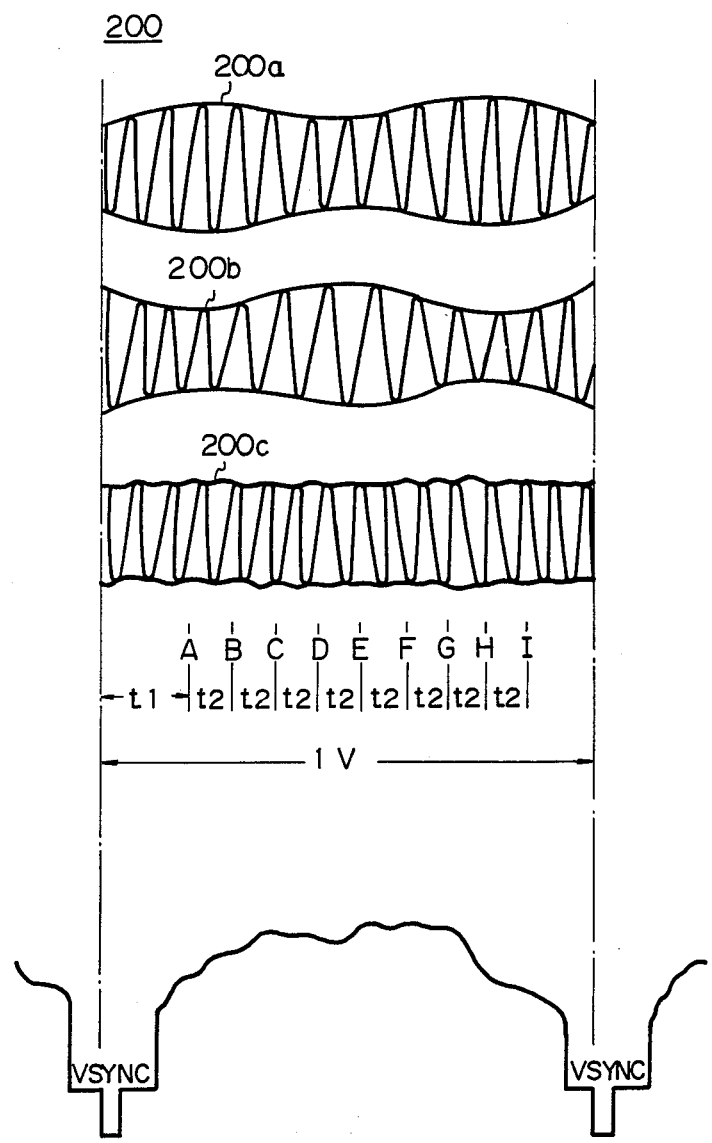
FIGS. 2A, 2B and 3A-3C are views useful for understanding an operation for detecting the envelope of a video signal performed by the tracking system of FIG. 1.

The envelope detector 38 is a detector responsive to an envelope 200, FIG. 2A, of an FM video signal recorded in a track on the disc surface 16, and adapted to apply a voltage complementary to the envelope to an output 42. The envelope detector is interconnected to an analog-to-digital converter (ADC) 46 via an envelope amplifier 44. In the illustrative embodiment, the ADC 46 has 256 quantizing levels and, in response to a request from the, controller 100, supplies them as an 8-bit data signal.

As described later, the controller 100 is responsive to manual operation to control the operation of the whole system. Advantageously, it may comprise a microprocessor.

In this particular embodiment, a play key PL for activating and deactivating the system, a forward key FW for moving the head 26 in a forward direction of track numbers (e.g. from the outermost track toward the innermost track), and a reverse key RV for moving it in the reverse direction are commonly connected to the controller 100. A track number designated through the key FW or RV is indicated by a display device 48, such as light emitting diodes (LED), or cathode ray tube (CRT). Needless to mention, the display 48 may be of the kind having a capability of producing sound such as for alarming.

The stepping motor 30 in this particular embodiment is a 4-phase, pulse-driven motor which is rotated about 18 degrees by one drive pulse, i.e. 360 degrees by twenty pulses. The head support mechanism 28 is constructed to feed the head 26 by about 5 microns in the direction R in response to the supply of one pulse to the stepping motor 30 and, therefore, by about 50 microns in response to ten pulses.

The pulses for driving the stepping motor 30 are generated by a drive circuit 50 which comprises a current amplifier. Specifically, the drive circuit, or driver, 50 generates exciting coil drive pulses for the stepping motor 30 as indicated by an excitation pattern which is supplied from the controller 100. A head feed control section 102 is shown in FIG. 4 which is used for the generation of the excitation patterns.

Referring to FIG. 4, a detailed construction of the controller 100 of FIG. 1 is shown. The controller 100 in FIG. 4 is assumed to comprise a microprocessor system. The operation of the tracking system in accordance with the illustrative embodiment will be described in detail with reference to FIG. 4 as well as to flowcharts and the like.

Figure 3A:
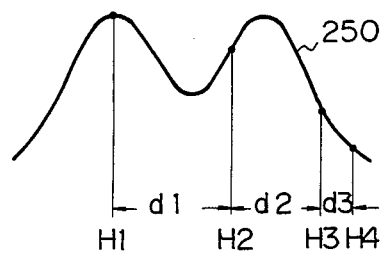
Figure 3B:
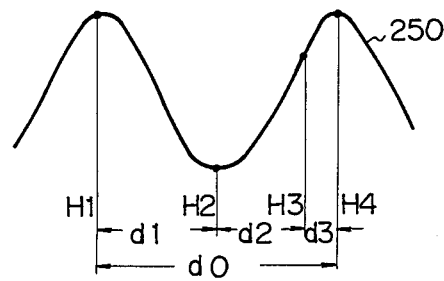

Assume that the controller 100 has turned on the signal DISK to rotate the disc 10 at a constant speed and the head 26 has just become on-track over a certain track on the disc 10 (position H1 in FIG. 3B). Then, the forward key FW or the reverse key RV is manipulated to shift the head 26 to the desired nearby track for tracking it. When the FW key, for example, is operated after the play key PL, a main control section 104 starts on a "tracking" action (300) shown in FIG. 5A.

First, when the signal MUTE is turned on (302), the video signal processor 36 mutes the video signal. The muting frees a viewer from having to observe noise images appearing on a video monitor connected to the terminal 40 while the head 26 is moving over those sections between nearby tracks where the signal level is low.

Then, the main control section 104 controls the head feed control section 102 to execute a head feed step 304 for transporting the head 26 by a distance d1 in the forward direction.

Before entering into detailed description of the step 304, description will be made in generalities on an envelope. As shown in FIG. 3B, a video signal sensed by the head 26 as the latter is shifted is applied as an envelope waveform 250 to the ADC 46 by way of the envelope detector 38 and amplifier 44. In response to a request from the controller 100, as will be described, the envelope waveform 250 is inputted to the controller 100 in the form of digital data. Now, if two nearby tracks are recorded accurately at a predetermined distance d0 (100 microns in this particular embodiment), then the peak-to-peak distance of the envelope 250 should be substantially equal to the track distance d0. Thus, in order that the head 26 may become on-track accurately at a positive peak, the head 26 in the illustrative embodiment is first moved to a position H2 spaced d1 from the position H1 and defining the center of the expected track distance, i.e., track pitch d0, and an envelope level is detected in that state. The position H2 at the distance d1 is preferably substantially the center of the track distance and, in this embodiment, the distance d1 is substantially equal to d0/2. If tracks are formed accurately at the distance d0, the position H2 corresponds to a negative peak, or trough.

At step 304, the head 26 is fed in the forward direction over the distance d1 according to a routine 360, which will be described later in detail. Then, the head feed is temporarily interrupted and an envelope detector section 106 is controlled to execute an envelope detecting step 306. This is effected by an "envelope detection" routine shown in FIG. 7, in which digital envelope data produced from the ADC 46 are read at discrete sampling points, weighted and added.

In more detail, as shown in FIG. 2A, while the head 26 is on-track, the FM video signal read out of the track has a waveform such as indicated by the reference numeral 200. That is, in this particular embodiment, one field of video signal (bottom in FIG. 2A) is reproduced for each full rotation of the disc 10 after demodulation. In the bottom of FIG. 2A, horizontal sync signals are not shown for simplicity.

Figure 7:
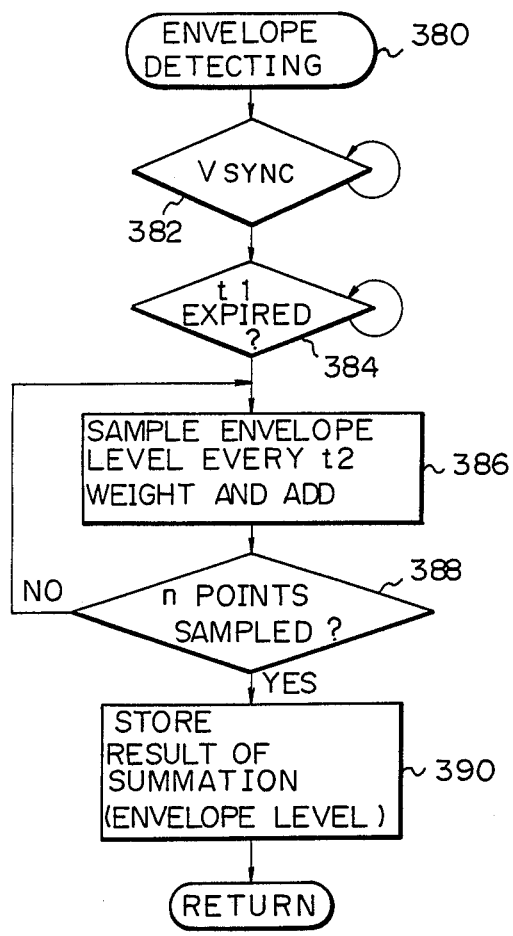

In the "envelope detection" routine shown in FIG. 7, the envelope data developed from the ADC 46 are successively read (386) at n sampling points which are generated at predetermined time intervals t2 after the lapse of a period of time t1 from the instant of the negative-going edge of the vertical sync signal VSYNC (382, 384). In this embodiment, since a field video signal compatible with the NTSC system is read out of the disc 10, one field (1 V) period is about 16.7 milliseconds. Advantageously, the sampling should be effected at uniform intervals over the 1 V period and at an odd number of points.

With this in view, t1 is selected to be 2.7 milliseconds, t2 1.5 milliseconds, and n 9 in the illustrative embodiment; then, the center of the screen is point E, i.e., a position spaced 8.7 milliseconds from the signal VSYNC in terms of time. Such times are governed by a timer 116.

As described above, the illustrative embodiment is constructed to read data produced from the ADC 46 at nine sampling points A-I so as to fetch the envelope data into the controller 100 (386). In the controller 100, the envelope detector section 106 reads the envelope data to temporarily store the data in an envelope store (area), or memory, 108. The sampled values respectively are multiplied by predetermined weights and added (386).

As shown in FIG. 2A, the weights assigned to the sampling points A-I in the illustrative embodiment are 1, 2, 2, 6, 7, 6, 4, 2 and 1, respectively. It should be noted, however, that the weights are merely relative values for the respective sampling points and are not limited to the above-mentioned. While, it is permissible to employ simple addition, for example, what is particularly advantageous is that the weight be larger in a central area of a field screen than in a surrounding peripheral area. This chiefly originates from a consideration described below.

Figure 2B:
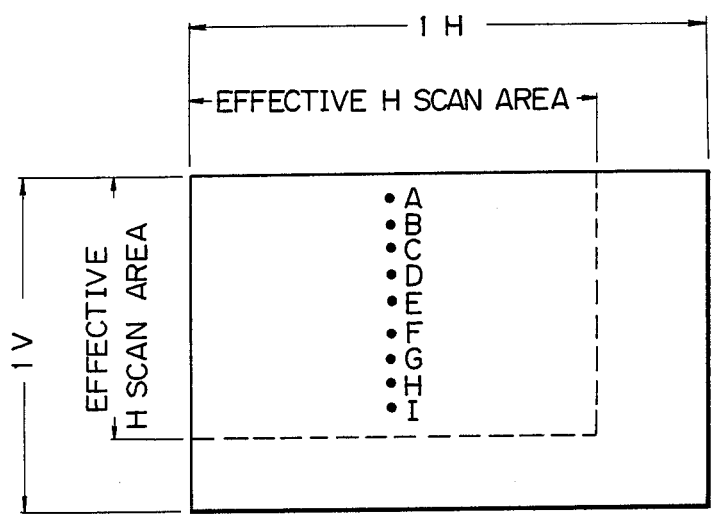

The disc 10 is chucked in a different position every time it is removably mounted on the drive shaft 14. That is, the disc 10 is not always mounted such that the center of its concentric tracks is accurately aligned with that of the drive shaft 14 and, moreover, the eccentricity varies each time. In addition, the tracks themselves are not always formed with their centers accurately aligned with each other during recording and, again, the eccentricity varies each time. The eccentricity causes the video signals reproduced from the tracks to undergo fluctuation in dependence upon the chucked position of the disc 10, as represented by waveforms 200a, 200b and 200c in FIG. 2A by way of example. To suppress the influence of such fluctuation on reproduction, it is advantageous to employ comparatively larger weights to the sampling points in a central area of the screen and comparatively smaller ones to those in a peripheral area, as shown in FIG. 2B. The so-called "wobbling type tracking control" using envelope levels provided by such weighted addition would reproduce a central area of the screen, which is most significant in enjoying a picture, in the best condition.

After the sampling of n (9) points and weighted addition thereof (388), the result of the addition is stored in the envelope store section 108 as an envelope level (390) at the head position H2. This is the end of the "envelope detection" routine.

Referring again to FIG. 5A, the main control section 104 causes the head feed control section 102 to move the head 26 again in the same transport direction by a distance d2 (308). Advantageously, the distance d2 is selected such that the sum of the distances d1 and d2 is slightly shorter than the proper track distance d0. Such will be described later in detail.

Referring to FIG. 3B, where tracks are formed at the regular track distances d0 on the disc 10, the tracking system in the illustrative embodiment temporarily stops the movement of the head at a position H3 just before the distance d0 is reached. At this position H3, the previously discussed "envelope detection" (FIG. 7) is executed. In short, the head 26 is moved over the distance d1 which is substantially one half the regular track distance d0 as previously described and, after the envelope detection, moved over the distance d2 slightly shorter than the distance d1, followed by another sampling and weighted addition. In this particular embodiment, the distance d2 is about 45 microns and, hence, the difference d3 between the distance d0 and the sum d1+d2 is about 5 microns.

In detail, when the head 26 has moved over the distance d2, the signal MUTE is turned off (310). If a track is positioned in a correct position H4, video signals recorded in the two nearby tracks may crosstalk while the head 26 moves from the position H1 to the position H3 close to the position H4, disturbing the picture on the monitor to make the viewer feel unpleasant. Nevertheless, the signal MUTE is turned off as described because the head 26 will be substantially on-track when moved to the neighborhood of the position H3 and, hence, interrupting the mute mode will cause little disturbance to the picture. As will be described, a time period of 13 V at minimum is necessary for tracking to be completed and too long a muting period would force the viewer to unwillingly observe the screen over a long non-picture period. Turning off the signal MUTE in the manner described advantageously shortens the muting period.

The main control 104, after turning off the signal MUTE (310), performs another "envelope detection" (routine 380 in FIG. 7) (312).

Next, a level compare and decide section 110 determines whether the envelope level detected at the position H3 is higher than a predetermined reference level L1 (314). The reference level L1 is selected to be slightly higher than a value resulting from weighted addition by the "envelope detection" when the head 26 runs that part of the disc surface 16 where a video signal track is absent (118 in FIG. 4). In this particular embodiment, the reference level L1 is about 10% of the envelope level which is detected from ordinary tracks.

When the comparison 314 shows that the envelope level is lower than the reference level L1, it is probable that a track is not formed there. Then, the head 26 is moved by another distance d3 in the same direction (316) and, at position H4, "envelope detection" is executed (322 in FIG. 5B). The distance d3 may be equal to a distance of movement of the head 26 which is caused by one pulse applied to the stepping motor 30. In this particular embodiment, the distance d3 is on the order of 5 microns. Thereafter, the envelope level is again compared with the reference level L1 (324). If the envelope level is lower than the reference level L1 even at the position H4, that is, when two levels commonly lower than the reference level L1 have been detected continuously (326), the level compare and decide section 110 decides that no video signal track is present there and performs a necessary processing. A counter 120 functions to count such states.

Then, in the illustrative embodiment, whether a time of an overall timer, which will be described later, has expired is determined (327), and, if not, the video signal processor 36 is electrically disconnected from the head 26 to set up the EE mode. This is instructed by the controller 100 to the processor 36 (330) by detecting the negative-going edge of the signal PG (328) and, synchronized therewith, turning on the signal EE. At this instant, the display 48 may be caused to indicate that the head 26 has moved to a non-recorded area and the system is switched to the EE mode. Further, the signal MUTE may be turned on instead of the signal EE, thereby muting the video signal. Alternatively, an arrangement may be made such that the head 26 is returned to its home position such as the outermost track position or transported in the opposite direction, that is, to the immediately preceding track.

Turning back to FIG. 5A, when the envelope level at the position H3 is found higher than the reference level L1 by the level comparison 314, it is compared with the envelope level detected last time, i.e. envelope at the position H2 (318). This time, the comparison is to determine whether a difference between the present and immediately preceding envelope levels is larger than a predetermined value $\Delta L$, and which one of them is larger than the other. Stated another way, which one of the two envelope levels is significantly larger is determined. Why the concept of significant difference is introduced into level comparison will be accounted for later. While the signal MUTE is turned off at the step 310 in the illustrative embodiment, such may be effected when "above reference level" is the result of the comparison 314. The latter is advantageous because the picture will be muted whenever the envelope level is lower than the reference level.

At the comparison 318, since the envelope level at the position H3 is usually larger than the significant difference $\Delta L$, the head 26 is determined to be positioned in the neighborhood of a peak of the envelope so that it is transported in the same direction by the distance d3 (316) and the previously described envelope detection step 322, FIG. 5B, is executed. This corresponds to the case shown in FIG. 3B.

Figure 3C:
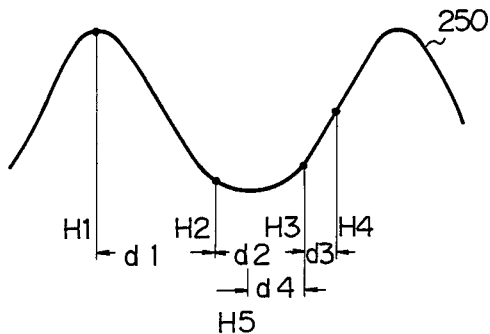

Meanwhile, at the comparison 318, where the envelope level at the position H3 is not larger than the envelope level at the position H2 by more than the significant difference $\Delta L$, the track distance is excessively narrow as shown in FIG. 3A or excessively wide as shown in FIG. 3C. Therefore, if detection and comparison of an envelope is performed without such decision or at a position further advanced by the distance d3, no significant difference will be detected when, for example, the track spacing is so wide that the head 26 is positioned at a trough as shown in FIG. 3C, possibly causing the head 26 to stop tracking there. In such a case, there is performed an operation for returning the head 26 in the opposite direction to confirm that it is at a trough (320), thereby quickening the wobbling control. The amount of the return, d4, should only be one which allows the head 26 to be confirmed to be at a trough; for example, it is substantially one half the distance d1, i.e., about one fourth the track pitch d0 in this particular embodiment. In this embodiment, the distance d4 is about 25 microns. At this position H5, the envelope detection step 322 is executed.

As described hereinabove, in moving the head 26 from one track to another, the system of the present invention does not transport it directly over the track distance d0 and transports it once over the distance d1 to substantially the center of the track distance d0 to detect an envelope level thereat. Where use is made of the magnetic disc 10 in which video tracks are recorded by an electronic camera, or where the head 26 is transported by a manual transport mechanism, the tracks are not always formed by the predetermined track distance d0. Even in such a case, the detection of the intermediate envelope in accordance with the present invention prevents the head 26 from being stopped at a trough of the envelope.

Where the actual difference as a result of comparison is not larger than the reference or significant difference $\Delta L$, the difference is regarded zero as previously discussed, for the following reason.

Various kinds of noise are contained in envelopes detected from tracks. For example, in the case where the controller 100 is implemented by a processor and the sampling time at the "envelope detection" 380, FIG. 7, fluctuates due to interruptions, irregularity in sampling time constitutes a source of noise. Especially, the ADC 46 for transforming an envelope into digital data develops noise due to accumulation of quantizing errors. In the vicinity of a peak of the envelopes, the head 26 is transported over the relatively short distance d3 and the envelope levels in such nearby positions are close to each other. Therefore, the level comparison is susceptive to those noise, resulting in delay of convergence of the system or oscillation of the head 26.

In the vicinity of a peak or a trough of the envelope, the head 26 is moved over the shortest head transport distance d3 of the tracking system and, if the resulting change in envelope level is short of the significant difference $\Delta L$, the head 26 is regarded at a peak or a trough. Thus, the significant difference $\Delta L$ is selected to be suitably larger than a change in envelope level which will occur when the head 26 is at a peak or a trough in an ideal condition and moved therefrom by the shortest distance d3. In this particular embodiment, the distance d3 is a distance associated with one drive pulse applied to the stepping motor 30. The significant difference $\Delta L$, therefore, is a minimum envelope level change occurring in a discrete head transport distance associated with one pulse applied to the stepping motor 30, plus a noise margin which is the influence of the previously mentioned noise. For example, it may be on the order of several percent of ordinary weighted and added envelope levels. Such allows decision of a peak or a trough to be performed with a minimum of influence of noise and, in addition, suppresses "oscillation" of the head which will be described.

Now, when the envelope level detected at the step 322 is higher than the reference level L1 (324), it is compared with an envelope level detected last time (332). In this instance, whether the flow in FIG. 5A be looped through the step 316, 318 or 320, the envelope level detected last time is the envelope level at the position H3. When the envelope level detected this time is larger than that detected last time by more than the significant difference $\Delta L$, the head may possibly be about to reach a peak of the envelope and, therefore, the head 26 is further transported in the same direction (344) to the repeat the loop inclusive of the envelope detecting step 322 until "no significant difference" results (332).

Where the tracks are accurately positioned as shown in FIG. 3B, the comparison 322 rarely decides that a significant difference exists and the operation usually advances downwardly in the flow chart of FIG. 5B.

For the ease of understanding, description of "oscillation" in a decision box 334 and the like will be made later. In a decision box 336, whether "no significant difference" has occurred four consecutive times is determined. Such occurrences are counted by a counter 120, FIG. 4.

If the significant difference has not occurred four consecutive times at the comparison 336, the head 26 is returned in the opposite direction over the distance d3 (348) and, then, the envelope detection 322, level decision 332 and other steps are repeated. So repeating the envelope detection and decision by reversing the movement of the head 26 is to eliminate the influence of dropout of video signals as will be described. In this manner, under a normal condition, two envelope detections and level comparisons are effected at each of the two positions H3 and H4.

The decision "no significant difference" may accidentally result from dropout of a video signal which in turn may be temporarily brought about by incomplete electrical contact of the head 26 during operation. To prevent such dropout from effecting the tracking control, the level detection and comparison is performed four times in total in the vicinity of a peak of the envelope for reconfirmation purpose as previously described.

Besides the case described, the step 348 is executed in two other different cases: when the level L1 has not continued twice at the step 326, and when vibration has not occurred four consecutive times. In any case, it is decided that no significant difference exists or the level difference is significantly small, and the head 26 is returned in the opposite direction by the distance d3 (348).

As already discussed, the head 26 is brought into a halt at the position H3 just before the movement thereof over the track distance d0 and, at the position H3, an envelope level is detected. This is to minimize the time required for tracking, while effecting the abovedescribed reconfirmation.

Figure 10:
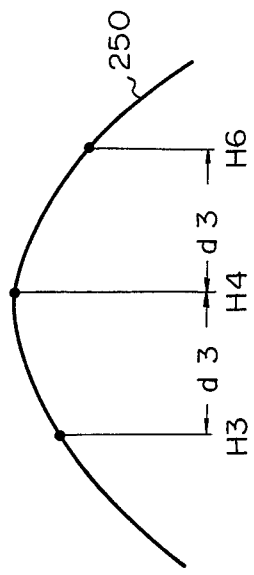

As shown in FIG. 10, for example, assume that the head 26 is transported to the position H4 at the distance d0, then an envelope is compared, then the head 26 is shifted in any direction over the distance d3 such as to the position H3, and then such a procedure is repeated for confirmation. This would wastefully consume an additional period of time of at least 1 V for the head 26 to reach an optimum track position. That is, confirmation would be performed in the order of positions H4, H3, H4, and H3, followed by the return of the head to the optimum position H4. In contrast, the tracking system of the present invention performs confirmation in the order of positions H3, H4, H3 and H4 starting from the position H3, convergence occurring at the final position H4. Since envelope level detection and comparison at one head position consumes at least a period of time during which the head 26 makes one round of the track, the tracking system of the present invention is capable of reaching an optimum track 1 V faster than the former.

If desired, the confirmation operation may performed first at the position H3, then at the position H4, and then at the position H4 after a moment, followed by a return to the position H3. Alternatively, it may occur first at the position H4, then at a position H6, and then at the position H6 after a moment, followed by a return to the position H4, or first at the position H4, then at the position H3, and then at the position H3 after a moment, followed by a then return to the position H4. Likewise, the confirmation may occur first at the position H6, then at the position H4, and then at the position H4, followed by a return to the position H6.

Now, the head support mechanism 28 extending from the step motor 30 to the head 26 should advantageously be provided with a high gear reduction ratio such as on the order of 100:1 in order to attain high positional accuracy for small movements of the head 26 on the order of 5 microns and to produce large torque by means of the small motor 30. However, since gears used for the above purpose involves some backlash, the transport of the head 26 involves play. This is usually compensated for by driving the motor 30 by two pulses in the reverse direction and, then, by one pulse in the forward direction, at the step of returning the head 26 by the distance d3 as described above. Theoretically, such is expected to cause the backlashes in opposite directions to cancel each other, allowing the head 26 to return by the distance d3. In practice, however, the return sometimes occurs beyond the distance d3. Performing another "envelope detection" at such an unexpected position might also result a value which is different from the precedingly detected one and, therefore, it is not sure that comparing the detected envelope level with the envelope level detected last time provides a result "no significant difference".

For the reason described above, the head 26 sometimes repeats the movement in the forward and reverse directions over a long period of time, i.e. "oscillation". That is, it sometimes happens that the result of comparison turns out to be "no significant difference" after the movement in the forward direction and "significant difference" after the subsequent movement in the reverse direction, such repeating for a long period of time. In accordance with the present invention, to eliminate limitless "oscillation", the occurrence of oscillation is sensed at step 334 and, when it has repeated four times, for example, (346), the head 26 is regarded on-track and the system advances to a predetermined operation, i.e. cancelling the EE mode operation. Specifically, the signal EE is turned off (342) in response to a fall of the signal PG (340). Since the system is usually in a mode other than the EE mode before then, the procedure described above will prove effective when the system has been incidentally caused into the EE mode. In that instance, the overall timer is triggered to start monitoring a still playback time concerned with that track (341). Such monitoring of time will be described later in detail. The number of the track over which the head 26 is positioned is indicated by the main control 104 on the display 48.

At the step 336, when "no significant difference" has repeated four consecutive times, it means that the envelope levels at the four points which are spaced each by d3 in opposite directions are distributed without any significant difference and, therefore, the head 26 is located either at a peak or a trough of the envelope where the level change is slow. Then, whether the envelope level is above a second predetermined value L2 is determined to see whether it is a peak or a trough (338). The value L2 is predetermined to be suitably higher than a level which is detected at a trough between ordinary tracks and subjected to weighted addition. It may be as small as about one sixth to one seventh of ordinary envelope levels.

If tne envelope level is below the value L2, the place where the head 26 is positioned is determined to be a trough; if above the value L2, then a peak. In the case of a trough, the head 26 is moved over the distance d2 (350) and, there, the "envelope detection" step 322 is executed. In this manner, when the envelope level is low, the head 26 is moved in the same direction by the distance d2 in order to prevent the head 26 from stopping at a trough, where the envelope level is low, to cause tracking at a trough. Such quickens the wobbling control. The head transport direction at the step 350 is forward and not reverse, because the case wherein nearby peaks are excessively close to each other as in FIG. 3A has already been excluded at the step 318, that is, what should be dealt with at the step 350 is only the excessive track distance such as one shown in FIG. 3C.

If the envelope level is higher than the reference level L2 indicating that the head 26 is at a peak, i.e., in an adequate on-track state, the EE mode is cancelled for confirmation purposes as previously described (340, 342). This connects the head 26 to the video signal processor 36 to reproduce a video signal recorded in the track. Although dependent upon a particular motor used, the head consumes 5–6 V at minimum from the instant of transport start to the instant of on-track, and 7 V for tracking, i.e. 12–13 V in total.

In the on-track condition, the head 26 repeatedly plays back the track and the video signal processor 36 transforms the reproduced video signal into a 1-frame 2-field, interlace scanned composite video signal, thereby reproducing a still picture. The overall timer set at the step 341 may be implemented by a timer 122 as shown in, FIG. 1, for example, and serves to monitor a total time for which a still picture read out of a single track is continuously displayed. The overall timer starts counting time when it has been triggered at the step 341. As soon as a predetermined time of the overall timer such as 15 minutes expires, the main control 104 starts on a tracking sequence 300 in order to shift the head 26 to the next track, thereby reproducing a still picture out of the next track. Such prevents the head 26 from moving along the same track for a long time damaging the recording surface 16.

In the manner described, the maximum still playback time per track is limited. Therefore, where the tracking system is left in the still playback mode for a long period of time, it may occur that the head 26 moves as far as the final track on the disc, surface 16 to reproduce a still picture therefrom and, at this instant, the time preset in the overall timer expires. Then, the tracking sequence 300, FIG. 5A, is started again to transport the head 26 to a non-recorded disc area, so that the operation advances to step 328 "level L1 continued twice?", FIG. 5B, to read the content of the overall timer. Since the overall timer has already run out, the processing flow advances to step 329, FIG. 5A, as indicated by a jump mark 2, thereby reversing the head transport direction. Thereafter, the processing proceeds according to a usual tracking operation for transporting the head 26 in the reverse direction.

As described above, when the head 26 has moved through all the tracks on the disc to the final track reproducing a still picture from each track for the maximum monitored time, it is fed in the reverse direction repeating the same action. Alternatively, the head 26 may be returned to a home position such as the position of a track to which is assigned the lowest number, so as to repeat the playback from that position.

Furthermore, an arrangement may be made such that when the overall timer has run out, the signal DISK, FIG. 1, is turned off to deenergize the motor 12 and cause the video signal processor 36 into the EE mode. In such a case, the display 48 may show that the time is over so that the play key PL, for example, may be manipulated to start still reproduction.

Figure 6:
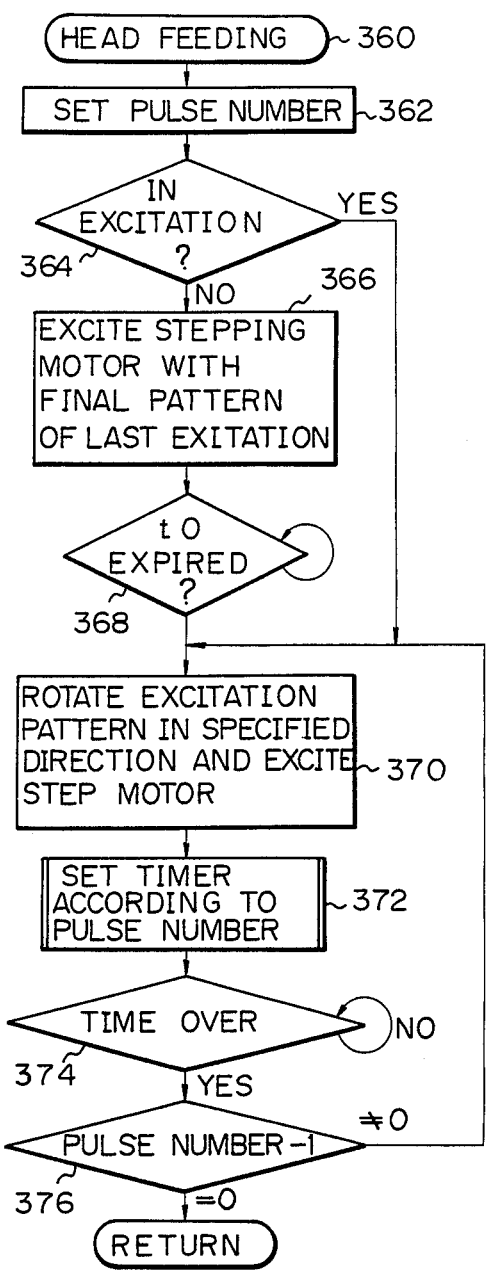

Now, the head transport operation such as at the step 304 is executed by the head feed control 102 according to a routine 360 shown in FIG. 6.

First, the main control section 104 sets in the head feed control section 102 a number of pulses associated with a head transport distance which is necessary for a particular step (362). In the illustrative embodiment, the number of pulses is ten if the distance is d1 and 50 microns and one if it is d3 and 5 microns. The stepping motor 30 in this particular embodiment has four-phase drive windings and has its rotor rotated 18 degrees in response to one pulse.

Excitation patterns of the four-phase windings are stored in a memory (excitation pattern storage 112). The storage 112 is incremented at each time of excitation to vary excitation signals $\phi A$–$\phi D$, thereby rotating the rotor. Hence, at the instant when the rotor is stopped, the storage 112 will have stored the final excitation pattern.

When the stepping motor 30 is to be rotated by a certain number of pulses, if the drive windings are not being excited (364), the final excitation pattern set up by the last excitation is read out to drive the windings according thereto (366). Since the final excitation pattern should represent the position which the rotor assumed when stopped last time, the excitation starting with the final excitation pattern will draw the rotor into the final stop position set up last time if some deviation of the rotor may occur between the last drive and the present. This allows the rotor to rotate accurately in synchronism with drive pulses. With this principle, the illustrative embodiment is capable of returning the rotor to a correct phase if the deviation is not larger than ±18 degrees. Such drawing continues for a time period t0 (e.g. on the order of 10 milliseconds) (368).

Next, the rotor is rotated by an angle associated with one pulse on the basis of the so established initial position and by rotating the excitation pattern one phase at a time in a direction corresponding to the head transport direction (370).

Figure 11:
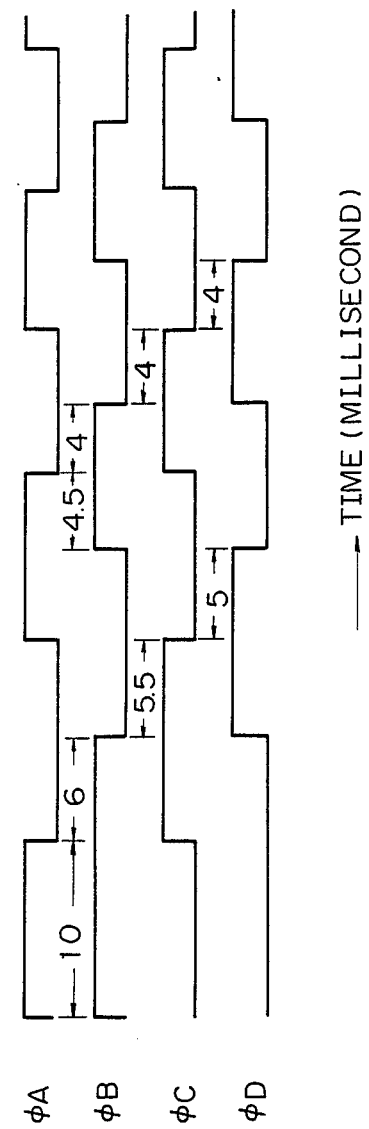

In this particular embodiment, the excitation time is sequentially reduced. That is, as shown in FIG. 11, if the last excitation pattern is $\phi A$–$\phi B$, it is excited for 10 milliseconds first, then the excitation pattern $\phi B$–$\phi C$ for 6 milliseconds, and then the excitation pattern $\phi C$–$\phi D$ for 5.5 milliseconds, and then the excitation pattern $\phi D$–$\phi A$ for 5 milliseconds. By gradually reducing the excitation time of each phase as described, it is possible to accelerate the rotor to a desired speed within a short period of time without loosing in-phase condition. In the illustrative embodiment, the duty ratio is 50% for 4-millisecond excitation under a normal condition. When the rotor is to be stopped, the pulse width is sequentially increased so that the rotor excitation is stopped after drawing the rotor into a desired stop position. This is successful to eliminate deviation of the stop position which would otherwise result from the inertia of the rotor due to abrupt interruption of the excitation.

Such sequential decrease and increase of the excitation time at starts and stops is implemented by varying the full count set in the timer 114, FIG. 4, at step 372 in accordance with a certain schedule which is associated with a preset number of pulses, then decrementing the preset pulse number by one (376) when the timer 114 has run out, and then repeatedly changing the excitation pattern until the preset pulse number reaches zero (370).

Figures 8, 9:
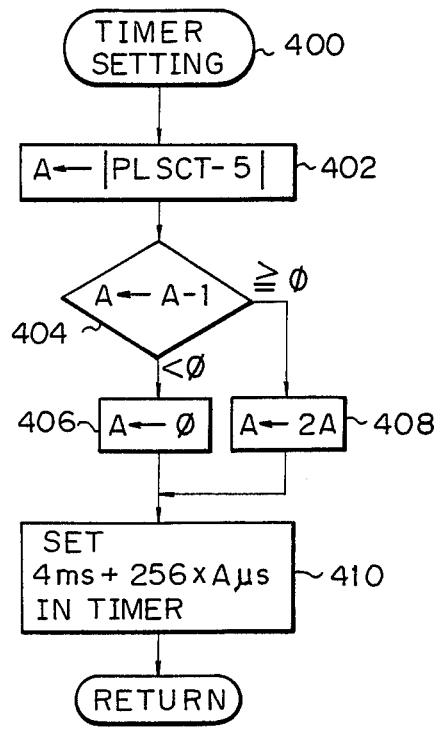
FIGS. 9, 10 and 11 are views useful for understanding of the operation shown in the flowcharts.

The timer 114 is set according to a routine 400 shown in FIG. 8. First, at step 402, "5" is subtracted from the content of a pulse counter PLSCT and the absolute value of the remainder is loaded in a register A. Then, at step 404, a sign of a value produced by subtracting "1" from the content of the register A is determined; if it is negative, "0" is loaded in the register (406) and, if it is not negative, then a value produced by doubling the content of the register A (408). At the subsequent step 410, a result of multiplying the content of the register A by "256" (microseconds) and adding 4 milliseconds to the product is loaded in the timer.

Where "10" is set in the pulse counter PLSCT, for example, the time preset in the timer will be 6 seconds and, where the former is "7", the latter will be 4.5 milliseconds. Examples of the number set in the pulse counter PLSCT and its associated time are shown in FIG. 9. In FIG. 9, the values associated with the numbers "10" to "6" of PLSCT are used for a start, and those associated with the numbers "4" to "1" for a stop.

The tracking system in accordance with the present invention has been described so far in conjunction with a case wherein the key FW or RV is manipulated to feed the head 26 to the next track step by step in the selected direction. However, it is also capable of randomly accessing any desired track, as will described.

Figure 12B:
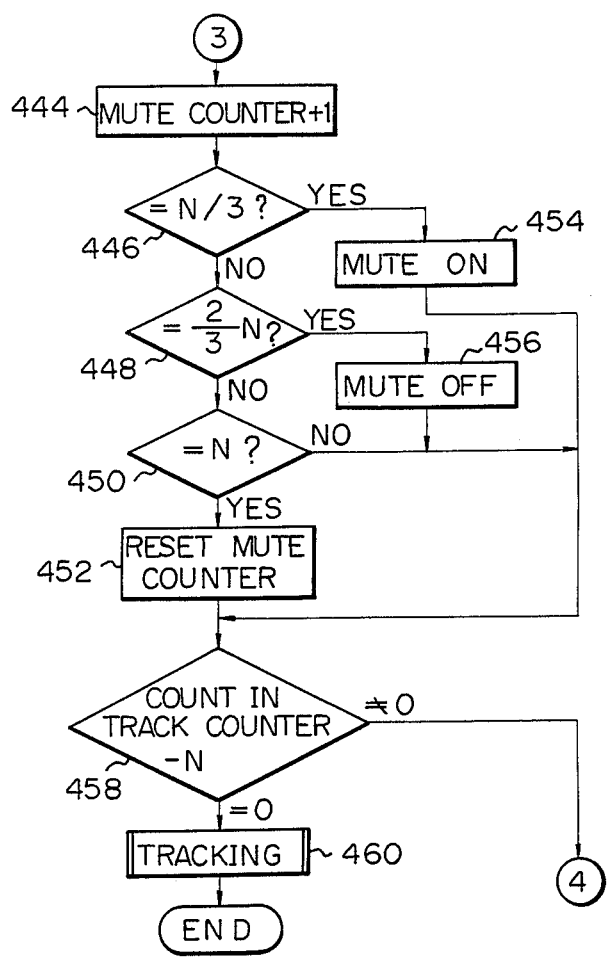

For example, when the play key PL is operated to set up a non-playback mode and, then, the key FW or RV is intermittently operated, the main control section 104 sequentially increments the display 48 which indicates a track number counted by the track counter. When any desired track number has appeared on the display 48, the play PL key is operated to cause the main control section 104 to start on a "object track specify" routine 420, FIGS. 12A and 12B.

Then, an object track number is compared with a current track number (422). If they compare unequal, a number of pulses associated with the difference is loaded in a counter which is adapted to set a number equal to a number produced by subtracting "1" from a difference between tracks (424, 428). The subtraction of "1" from the track difference is to start the tracking routine 300, FIGS. 5A and 5B, at a track immediately preceding an object track; as will be recalled, "envelope detection" is effected first at the position H2 between tracks, FIG. 3B, during a tracking action to an object track. If [object track number minus present track number] is positive, a positive feed direction is set and, if it is negative, then a negative feed direction (426, 430).

In the above condition, the stepping motor 30 is driven to move the head 26 to a track position H1 just before the object track. While this head transport is executed by steps 432-458, the steps 432-442 may be substantially idential with the steps 364-374 of the head feed routine 360, FIG. 6. That is, drawing the rotor into an initial position and sequentially increasing or decreasing the speed of the motor 30 are effected.

In accordance with the present invention, muting occurs between nearby tracks. In the case of random access, muting is applied to an intermediate section of the track distance d0, e.g. over ⅓ of the track distance d0. The main control 104, therefore, uses the counter 124 or the like as a mute counter and increments it every time the stepping motor 30 is excited by one pulse (444). As soon as the mute counter equals to N/3, the signal MUTE is turned on and the control returns through decision box 458 to the step 438 as indicated by a transfer mark 4 so as to further feed the head 26. Thereafter, when the mute counter has reached 2N/3, the signal MUTE is turned off and the control returns to box 438 via decision box 458 and the transfer mark 4, thereby further feeding the head 26. In this manner, a video signal is muted in a central portion between nearby tracks over ⅓ of the track distance.

As the mute counter becomes N (450), it is reset and the pulse counter is decremented by N. Then, the control returns to the step 438 via step 458 and the transfer mark 4 to thereby continue the drive of the motor 30. Decrement of the pulse counter to "0" indicates that the head 26 has reached the track position H1 just before the desired track, so that the control advances to a tracking step 460 where the previously discussed tracking routine 300 will be executed.

As described above, the wobbling type tracking operation is started at a track just before one, minimizing an average access time in the case of random access. Furthermore, it is not that a video signal is completely muted before a desired track is reached, but that a portion where disturbance to a picture does not occur is not muted each time the head 26 moves past a track preceding the desired one. This frees a viewer from unpleasant feelings and, in addition, allows the viewer to positively see that a random access is under way.

In summary, it will be seen that the present invention provides a tracking system for a rotary magnetic recording medium which is capable of performing a tracking control with accuracy such that a central area of a reproduced picture, which is most significant in viewing a picture, is always reproduced in the best condition, whatever the loaded position of the recording medium in a playback device may be.

What is claimed is:

1. A tracking system for a rotary magnetic recording disc having a plurality of tracks recorded concentrically thereon, comprising:
   driving means having a driving shaft which is removably loaded with said rotary magnetic recording disc for rotatably driving said disc;
   magnetic transducer means for sensing signals recorded on said tracks of said magnetic recording disc;
   transducer feeding means for feeding said magnetic transducer means to a position where one desired track is located; and
   control means for controlling said transducer feeding means to effect tracking,
   said control means including operational means for sampling a signal sensed by said magnetic trasnducer means in response to the rotation of said magnetic recording disc at a plurality of sampling points generally distirbuted along the track, and summing the sampled values with predetermined weight according to the location of the sampling point along the track to produce a weighted addition result,
   said operational means including means for determining a difference between a present result of weighted addition and an immediately preceding weighted addition result and producing a difference signal if the difference exceeds a first predetermined value,
   said control means executing a tracking control on said transducer feeding means in response to the produced difference signal to cause said magnetic transducer means to move to a position where a larger weighted addition result is determined,
   said control means controlling said transducer feeding means to cause said magnetic transducer means to remain at a position where said magnetic transducer means is located when said means for determining determines that a difference between a present result of weighted addition from an immediately preceding of weighted addition is associated with a peak of said signal recorded on said track.

2. A tracking system in accordance with claim 1, wherein a signal recorded on a track contains a video signal which constitutes one effective picture frame to be displayed on a screen;
   said operational means sampling the signal at points associated with predetermined positions which include a central portion of the picture frame;
   the predetermined weights being larger in the central portion of the picture and smaller in a peripheral portion of the picture which surrounds the central portion.

3. A tracking system in accordance with claim 1, wherein said plurality of sampling points are selected to be an odd number.

4. A tracking system in accordance with claim 3, wherein said odd number is nine.

5. A tracking system in accordance with claim 1, wherein the video signals are recorded on the magnetic recording disc in the form of a frequency-modulated signals;
   said system further comprising means for detecting an envelope of the frequency-modulated signals to provide said operational means with said signal to be sampled.

6. A tracking system in accordance with claim 1, wherein said means for determining determines that the difference is associated with the peak of the signal recorded on the track if the present and immediately preceding results of weighted addition exceed a second predetermined value, and the differences determined do not exceed the first predetermined value over a predetermined plurality of successive times.

7. A tracking system in accordance with claim 1, wherein said means for determining determines that the difference is associated with the peak of the signal recorded on the track if the present and immediately preceding results of weighted addition exceed a second predetermined value, and said magnetic transducer means is caused to move between two predetermined positions on said magnetic recording disc.

8. A tracking system for a rotary magnetic recording disc having a plurality of tracks recorded concentrically thereon comprising:

driving means for rotatably driving said magnetic disc;

magnetic transducer means for sensing signals recorded on said tracks of said magnetic disc;

transducer feeding means for feeding said magnetic transducer means to a position over said magnetic disc at which a desired track is located; and control means for controlling said transducer feeding means, including, operational means for sampling a signal sensed by said magnetic transducer means at a first particular position over said desired track at a plurality of sampling points along the track in response to the rotation of said magnetic disc, and summing the sampled values with predetermined weights according to the location of the sampling point along the track to obtain a weighted addition result, and means for determining a difference between a presently obtained weighted addition result and an immediately preceding weighted addition result obtained at a second particular position spaced apart from said first particular position, and producing a difference signal if said difference exceeds a first predetermined value;

said control means controlling said transducer feeding means to feed said magnetic transducer means to a position corresponding to a maximum weighted addition result in response to said difference signal from said means for determining.

* * * * *